US010261870B2

(12) United States Patent
Cmielowski et al.

(10) Patent No.: US 10,261,870 B2
(45) Date of Patent: Apr. 16, 2019

(54) RISK FORMULA FOR ERRONEOUS SOFTWARE COMPONENTS DETECTION

(71) Applicant: International Business Machines Corporation, Armonk, NY (US)

(72) Inventors: Lukasz G. Cmielowski, Cracow (PL); Marek Franczyk, Bojszowy (PL); Robert Karcz, Cracow (PL); Andrzej J. Wrobel, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/753,606

(22) Filed: Jun. 29, 2015

(65) Prior Publication Data
US 2016/0378618 A1 Dec. 29, 2016

(51) Int. Cl.
*G06F 11/00* (2006.01)
*G06F 11/14* (2006.01)
*G06F 11/36* (2006.01)
*G06F 11/34* (2006.01)

(52) U.S. Cl.
CPC ........ *G06F 11/1479* (2013.01); *G06F 11/008* (2013.01); *G06F 11/3452* (2013.01); *G06F 11/3612* (2013.01); *G06F 11/3624* (2013.01); *G06F 11/3692* (2013.01); *G06F 2201/81* (2013.01); *G06F 2201/865* (2013.01)

(58) Field of Classification Search
CPC ............... G06F 11/3612; G06F 11/008; G06F 11/1479; G06F 11/3452; G06F 11/3624; G06F 11/3692; G06F 2201/865
See application file for complete search history.

(56) References Cited

U.S. PATENT DOCUMENTS

| 6,895,577 | B1 | 5/2005 | Noble et al. | |
| 8,676,530 | B2 | 3/2014 | Roth et al. | |
| 2006/0085325 | A1* | 4/2006 | Jammal | G06Q 40/025 705/38 |
| 2011/0231817 | A1* | 9/2011 | Hadar | G06Q 10/00 717/120 |

(Continued)

OTHER PUBLICATIONS

Czerwonka et al.; "CRANE: Failure Prediction, Change Analysis and Test Prioritization in Practice—Experiences from Windows"; 2011 Fourth IEEE International Conference on Software Testing, Verification and Validation; pp. 357-366; © 2011 IEEE.

(Continued)

*Primary Examiner* — Li B. Zhen
*Assistant Examiner* — Amir Soltanzadeh
(74) *Attorney, Agent, or Firm* — William H. Hartwell

(57) ABSTRACT

A method for performing software error detection and prediction. The method includes identifying a plurality of software components in a computer software product. For each of the software components of the plurality of software components, the risk-relevant historical data pertaining to the respective software component is measured, then classified into at least a set of risk-increasing data and a set of risk-decreasing data. The set of risk-increasing data and the set of risk-decreasing data are then normalized, and a failure risk value for the respective software component is calculated by subtracting a weighted sum of the normalized values for the risk-decreasing data from a weighted sum of the normalized values for the risk-increasing data.

17 Claims, 5 Drawing Sheets

(56) References Cited

U.S. PATENT DOCUMENTS

| | | | |
|---|---|---|---|
| 2013/0346956 A1* | 12/2013 | Green | G06F 8/65 717/168 |
| 2014/0033176 A1* | 1/2014 | Rama | G06F 11/3688 717/124 |
| 2014/0040867 A1 | 2/2014 | Wefers et al. | |
| 2014/0351793 A1 | 11/2014 | Bartley et al. | |

OTHER PUBLICATIONS

Dharmalingam et al.; "Criticality Analyzer and Tester—An Effective Approach for Critical Components Identification and Verification"; ICT and Critical Infrastructure: Proceedings of the 48th Annual Convention of CSI—vol. I, Advances in Intelligent Systems and Computing 248; pp. 663-670; © Springer International Publishing Switzerland 2014.

Felderer et al.; "Experiences and Challenges of Introducing Risk-Based Testing in an Industrial Project"; SWQD 2013, LNBIP 133, pp. 10-29, © Springer-Verlag Berlin Heidelberg 2013.

Jeyamala et al.; "Fault-Prone Components Identification for Real Time Complex Systems Based on Criticality Analysis"; International Journal of Computer Science and Informatics, vol. 3, Issue 2 (National Conference on Recent Trends in Software Testing, RTST 2013, Rourkela, India, May 27-29, 2013. pp. 17-23.

* cited by examiner

| METRIC | CSI-1 | CSI-2 | CSI-3 | CSI-4 | CSI-5 | CSI-6 | CSI-7 |
|---|---|---|---|---|---|---|---|
| NUMBER OF APARs | 0 | 0 | 0 | 0 | 0 | 0 | 0 |
| CHANGESET OWNERS | 1 | 1 | 1 | 1 | 2 | 0 | 0 |
| NUMBER OF CHANGESETS | 5 | 5 | 4 | 1 | 2 | 0 | 0 |
| NUMBER OF AFFECTED FILES | 13 | 22 | 4 | 4 | 2 | 0 | 0 |
| NUMBER OF DEFECTS | 1 | 0 | 0 | 3 | 6 | 3 | 0 |
| STATIC CODE ANALYSIS | 0 | 0 | 0 | 7 | 7 | 0 | 0 |
| HOT FACTOR | 0.817 | 0 | 0 | 0 | 0 | 0 | 0.666 |
| NUM OF AUTOMATED TESTS | 70 | 0 | 0 | 0 | 0 | 0 | 22 |
| NUM OF MANUAL TESTS | 0 | 0 | 0 | 0 | 60 | 0 | 0 |

FIG. 3A

| METRIC | CSI-1 | CSI-2 | CSI-3 | CSI-4 | CSI-5 | CSI-6 | CSI-7 | WEIGHT |
|---|---|---|---|---|---|---|---|---|
| NUMBER OF APARs | 0 | 0 | 0 | 0 | 0 | 0 | 0 | 1 |
| CHANGESET OWNERS | 0.207 | 0.207 | 0.207 | 0.207 | 1.656 | 1.24 | 1.24 | 1 |
| NUMBER OF CHANGESETS | 1.155 | 1.1555 | 0.706 | -0.642 | -0.193 | -1.09 | -1.09 | 1 |
| NUMBER OF AFFECTED FILES | 0.805 | 1.9078 | -0.3 | -0.298 | -0.543 | -0.79 | -0.79 | 1 |
| NUMBER OF DEFECTS | -0.378 | -0.8189 | -0.82 | 0.504 | 1.827 | 0.504 | -0.82 | -1 |
| STATIC CODE ANALYSIS | -0.586 | -0.5855 | -0.59 | 1.464 | 1.464 | -0.59 | -0.59 | 1 |
| HOT FACTOR | 1.66 | -0.5813 | -0.58 | -0.581 | -0.581 | -0.58 | 1.246 | -1 |
| NUM OF AUTOMATED TESTS | 2.155 | -0.4982 | -0.5 | -0.498 | -0.498 | -0.5 | 0.336 | -1 |
| NUM OF MANUAL TESTS | -0.378 | -0.378 | -0.38 | -0.378 | 2.268 | -0.38 | -0.38 | -1 |
| | | | | | | | | |
| FAILURE RISK VALUE | -1.478 | 4.9612 | 2.307 | 1.685 | -0.63 | -2.75 | -4.09 | |
| | | | | | | | | |
| RESCALED RISK VALUE | 28.85 | 100 | 70.66 | 63.80 | 38.22 | 14.80 | 0 | |

FIG. 3B

| METRIC | CSI-7 | CSI-6 | CSI-1 | CSI-5 | CSI-4 | CSI-3 | CSI-2 |
|---|---|---|---|---|---|---|---|
| NUMBER OF APARs | 0 | 0 | 0 | 0 | 0 | 0 | 0 |
| CHANGESET OWNERS | 1.24 | 1.24 | 0.207 | 1.656 | 0.207 | 0.207 | 0.207 |
| NUMBER OF CHANGESETS | -1.09 | -1.09 | 1.155 | -0.193 | -0.642 | 0.706 | 1.1555 |
| NUMBER OF AFFECTED FILES | -0.79 | -0.79 | 0.805 | -0.543 | -0.298 | -0.3 | 1.9078 |
| NUMBER OF DEFECTS | -0.82 | 0.504 | -0.378 | 1.827 | 0.504 | -0.82 | -0.8189 |
| STATIC CODE ANALYSIS | -0.59 | -0.59 | -0.586 | 1.464 | 1.464 | -0.59 | -0.5855 |
| HOT FACTOR | 1.246 | -0.58 | 1.66 | -0.581 | -0.581 | -0.58 | -0.5813 |
| NUM OF AUTOMATED TESTS | 0.336 | -0.5 | 2.155 | -0.498 | -0.498 | -0.5 | -0.4982 |
| NUM OF MANUAL TESTS | -0.38 | -0.38 | -0.378 | 2.268 | -0.378 | -0.38 | -0.378 |
| | | | | | | | |
| FAILURE RISK VALUE | -4.09 | -2.75 | -1.478 | -0.63 | 1.685 | 2.307 | 4.9612 |
| | | | | | | | |
| RESCALED RISK VALUE | 0 | 14.80 | 28.85 | 38.22 | 63.80 | 70.66 | 100 |

FIG. 3C

RISK FORMULA FOR ERRONEOUS SOFTWARE COMPONENTS DETECTION

BACKGROUND

The present invention relates generally to the field of software verification, and more particularly to detection and prediction of erroneous software components.

Static program analysis is the analysis of computer software (for example, code structure, syntax, and data flow) that is performed without actually executing the computer software. In many cases the static program analysis is performed on some version/revision of the source code, and in the other cases, the analysis is performed on some form of the object (i.e. compiled) code. Static program analysis is typically performed by an automated tool, but can also include human code reviews. In the course of performing the static program analysis, software bugs may be identified within the software program. A software bug is anything (for example, an error, flaw, failure, or fault) in a software program that causes the software program to produce an incorrect or unexpected result, or to behave in unintended ways.

SUMMARY

Embodiments of the present invention disclose a method, computer program product, and system for performing software error detection and prediction. The method includes identifying a plurality of software components in a computer software product. For each of the software components of the plurality of software components, risk-relevant historical data pertaining to the respective software component is measured, then classified into at least a set of risk-increasing data and a set of risk-deceasing data. The set of risk-increasing data and the set of risk-decreasing data are then normalized, and a failure risk value for the respective software component is calculated by subtracting a weighted sum of the normalized values for the risk-decreasing data from a weighted sum of the normalized values for the risk-increasing data.

BRIEF DESCRIPTION OF THE DRAWINGS

FIG. 3A is a table depicting erroneous software component data for various features of software components, in an embodiment in accordance with the present invention.

FIG. 3B is a table depicting normalized erroneous software component data for the various features of software components, in an embodiment in accordance with the present invention.

FIG. 3C is a table depicting software components ordered by computed associated failure risk values, in an embodiment in accordance with the present invention.

DETAILED DESCRIPTION

Embodiments in accordance with the present invention recognize that a method for performing software error detection and prediction on software products is essential in modern programming environments. Embodiments of the present invention describe an automated way of performing software error detection and prediction by subdividing the software into components and then—for each component—measuring and classifying risk-relevant historical data into risk-increasing and risk-decreasing data. The risk-increasing and risk-decreasing data is then normalized and a failure risk value is calculated for each component. This method of software error detection and prediction enables development and test teams to determine which area of a software product requires the most attention and identifies the component(s) that may contain the majority of hidden defects. This method of software error detection and prediction will benefit software solution providers by identifying where test teams should put their limited resources to optimize test effort and maximize the number of defects found in high priority areas. Furthermore, before software testing begins on a software product, it can be beneficial to know what has changed in the product since the last release (or build) and how that change has impacted to the product quality, so that limited resources may be applied to those areas to improve quality.

Figure 1:
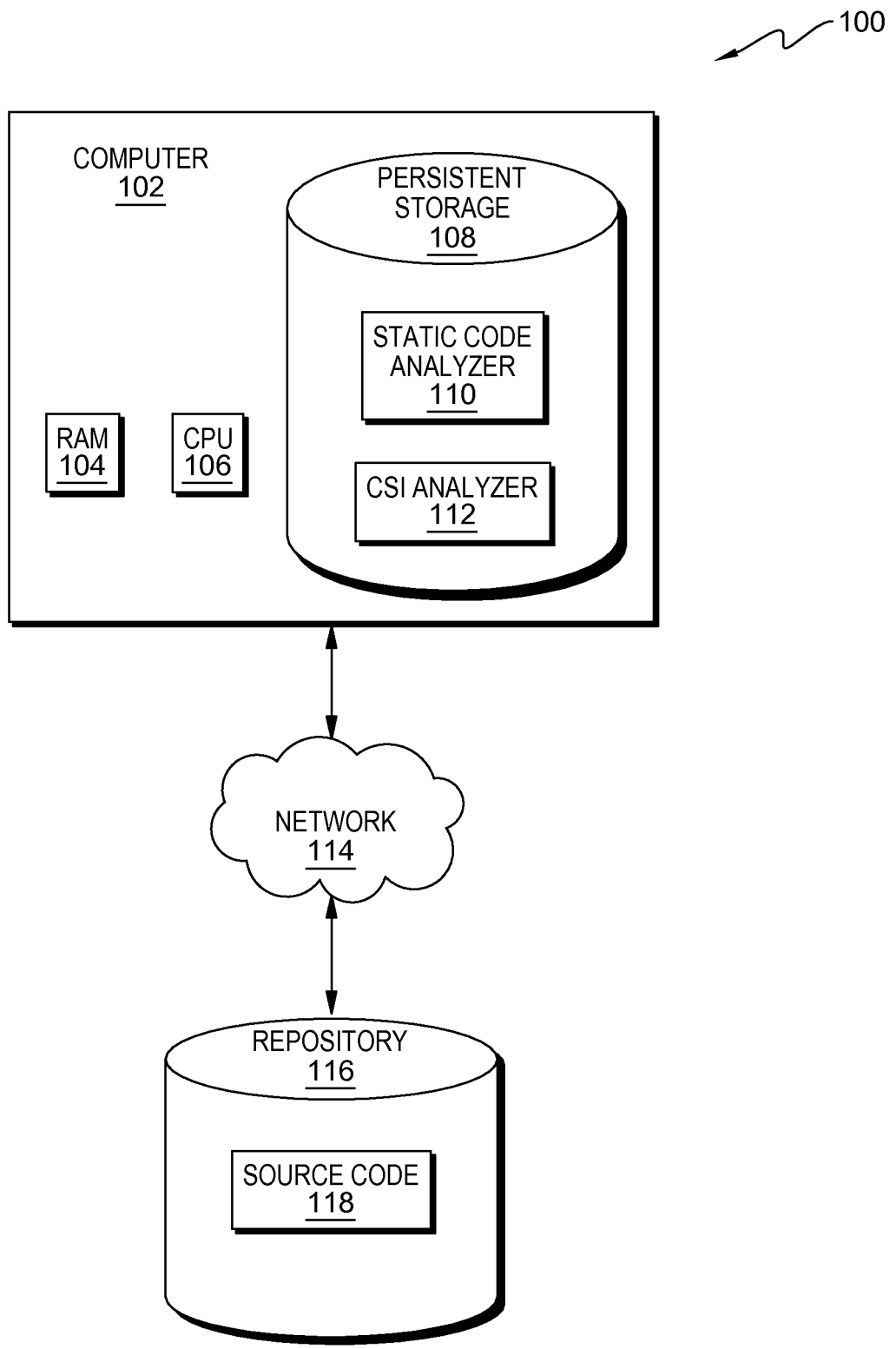
FIG. 1 is a functional block diagram illustrating a data processing environment, in an embodiment in accordance with the present invention.

Embodiments in accordance with the present invention will now be described in detail with reference to the Figures. FIG. 1 is a functional block diagram, generally designated 100, illustrating a data processing environment, in an embodiment in accordance with the present invention.

Data processing environment 100 includes computer 102 and source code repository 116 interconnected over network 114. Computer 102 includes random access memory (RAM) 104, central processing unit (CPU) 106, and persistent storage 108. Computer 102 may be a Web server, or any other electronic device or computing system, capable of processing program instructions and receiving and sending data. In some embodiments, computer 102 may be a laptop computer, a tablet computer, a netbook computer, a personal computer (PC), a desktop computer, a personal digital assistant (PDA), a smart phone, or any programmable electronic device capable of communicating over a data connection to network 114. In other embodiments, computer 102 may represent server computing systems utilizing multiple computers as a server system, such as in a distributed computing environment. In general, computer 102 is representative of any electronic devices or combinations of electronic devices capable of executing machine-readable program instructions and communicating with source code repository 116 via network 114 and with various components and devices within data processing environment 100.

Computer 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Static code analyzer 110 and component sub-component impact (CSI) analyzer 112 are stored in persistent storage 108, which also includes operating system software, as well as software that enables computer 102 to perform static program analyses of computer code, and communicate with source code repository 116, as well as other computing devices of data processing environment 100 over a data connection on network 114.

Static code analyzer 110 is stored in persistent storage 108. Static code analyzer 110 is used to analyze non-executing software (i.e., source code 118), contained in repository 116 to find software bugs (e.g., programming errors and defects) and to ensure conformance to coding guidelines. An example of an issue caused by a bug is a memory leak. In computing, a memory leak refers to the gradual loss of available computer memory (e.g., RAM 104), when a program (e.g., an application or part of the operating system), repeatedly fails to return memory that the program has obtained for temporary use. Memory leaks can occur for many reasons, including, for example, coding errors, errors in software design, errors caused by related frameworks or operating systems, and/or compiling errors. As a result of a memory leak, the available memory for the program or the associated part of the operating system becomes exhausted, and the program can no longer function. For a program that is frequently opened or called, or a program that runs continuously, even a very small memory leak can eventually cause the program or the system to crash or terminate. In addition to finding bugs, the use of static code analyzer 110 ensures a defined level of code quality by adhering to industry standards and/or standards set by development teams.

Component subcomponent impact analyzer 112 is also stored in persistent storage 108. Generally speaking, CSI analyzer 112 is used to calculate risk of potential defects in the data associated with specific aspects of interest for source code 118.

CSI is the process of breaking down a product (or, a "component") into smaller pieces. For example, if a component is a vehicle, then the subcomponents, also referred to as subfeatures, may be the vehicle's windows, doors, brakes, etc. The impacts of the vehicle may include a broken window or a broken engine. The impact of having a broken window would still result in the vehicle being drivable. However, a broken engine would result in an undrivable vehicle. The resulting combination of a component (e.g. a vehicle), a set of subcomponents (e.g. widows, doors, brakes), and impacts for the subcomponents (e.g. broken window, broken engine) make up the component subcomponent impacts analyzed by analyzer 112.

In FIG. 1, network 114 is shown as the interconnecting fabric between data protection computer 102 and source code repository 116. In practice, network 114 may be any viable data transport network. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between computer 102 and source code repository 116 in accordance with an embodiment of the invention.

Source code repository 116 is included in data processing environment 100. Source code repository 116 is used as a revision control system, also referred to as version control or source control, that manages changes to documents, computer programs, large web sites, and other collections of information (e.g., source code 118). In some embodiments, changes are identified by a number or letter code, termed the "revision number," "revision level," or simply "revision."

For example, an initial set of files is "revision 1." When the first change is made, the resulting set is "revision 2," and so on. Each revision is associated with a timestamp and the person making the change. Revisions may be compared, restored, and with some types of files, merged.

Source code repository 116 includes source code 118, also referred to as a code base. In software development, a code base refers to a whole collection of source code that is used to build a particular software system, application, or software component. Typically, a code base includes only human-written source code files and generally, does include configuration and property files necessary for the build. In an example embodiment, source code 118 is the target source to be analyzed by static code analyzer 110. In another example embodiment, more than one source code repository 116 and/or source code 118 (e.g., code base) may be identified as the target source.

Figure 2:
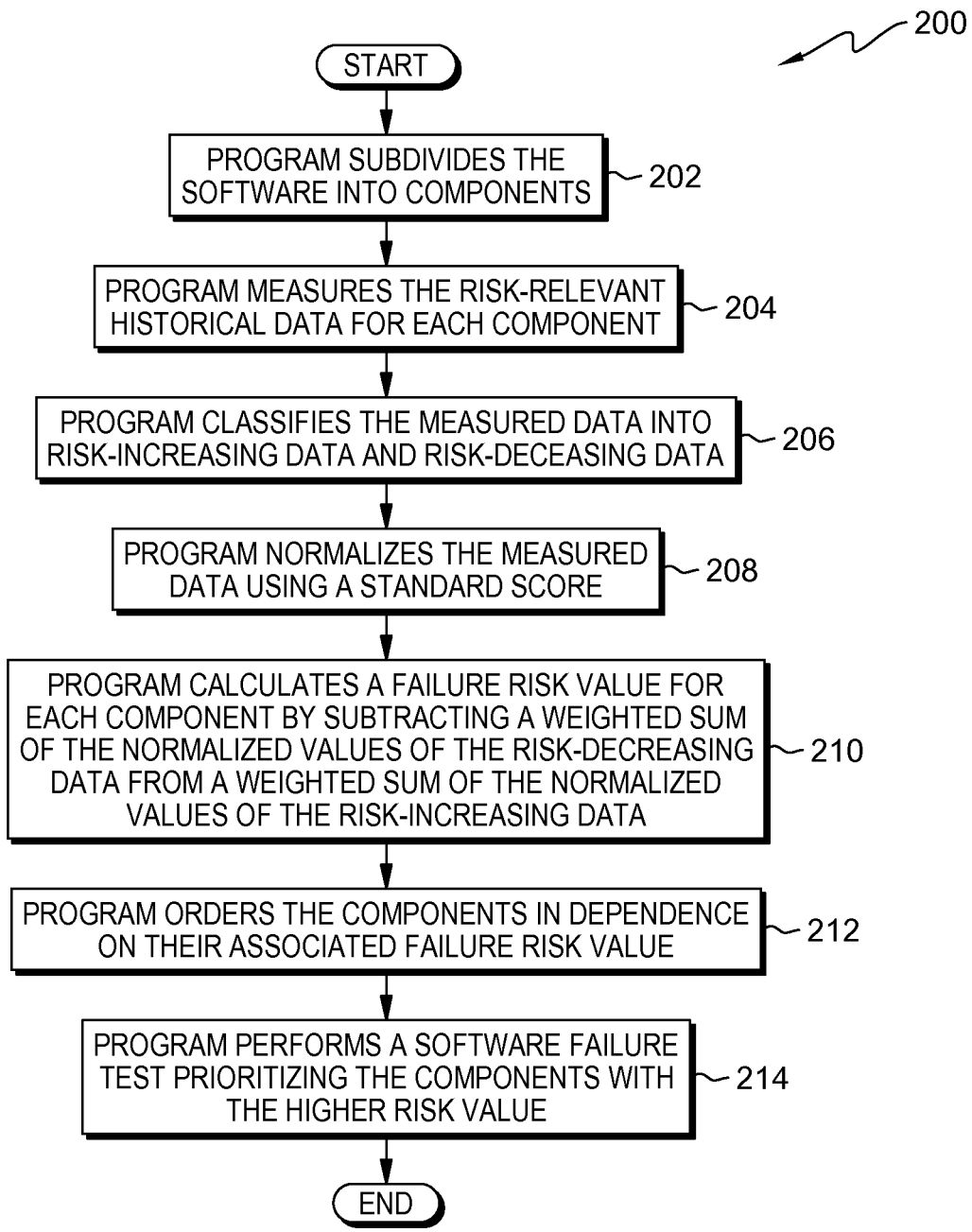
FIG. 2 is a flowchart depicting operational steps of erroneous software component detection and prediction, on a server computer within the data processing environment of FIG. 1, in an embodiment in accordance with the present invention.

FIG. 2 is a flowchart, generally designated 200, depicting operational steps of erroneous software component detection and prediction, on a server computer within the data processing environment of FIG. 1, in an embodiment in accordance with the present invention. In an example embodiment, CSI analyzer 112 performs an analysis of source code 118 stored in repository 116 to calculate the risk of potential defects found in source code 118. In another example embodiment, static code analyzer may reside in repository 116 or on another computing device (not shown) in data processing environment 100. In other embodiments, static code analyzer 110 may be executed upon the completion of a source code build on repository 116.

CSI analyzer 112 divides or subdivides the software into component—subcomponent—impact (CSI) as depicted in step 202. In the example embodiment, CSI analyzer 112 divides the software into one or more components. An example of one component in the target software may be a socket connection for a software application. A socket is an endpoint of a two-way communication link between two programs running on a network. Sockets may be implemented by an application programming interface provided by an operating system that allows application programs to control and use network sockets generally based on the Berkeley sockets standard, which identifies socket API functions such as create, close, connect, bind, accept, read, and write.

Subcomponents of the socket connection may be creating the socket connection, closing the socket connection, binding the socket connection, accepting the socket connection, reading from the socket connection, and writing to the socket connection.

An example of an impact of creating the socket connection may be a failure on creating the socket connection. If the creation of the socket connection fails, the impact would be not being able to bind to an IP address and the software application will not be able to receive data from the other side. In other example embodiments, instead of dividing the software into components, CSI analyzer may divide the software using verbs that describe the particular abilities or attributes of the software, where the verbs used may include "reliable", "fast", and "secure". An example of this would be "Sending data using an internet protocol version 6 (IPv6) address". This would be a verb of the "Socket" component when trying to meet "reliable" attribute. In general, any method may be used to divide the software into components where risk-relevant data may be measured for each component. Risk-relevant data may be any data associated with the source code 118 that might be relevant to determining whether source code 118 is at risk for bugs or other errors.

Some examples of types of risk-relevant data include, but are not limited to, data related to the following categories: (i) a quantity of code that has been changed (such as the number of lines of new code in a module); (ii) an amount of code that has previously been changed; (iii) an amount of bugs that have been previously detected (such as the number of "defects" that have been opened); (iv) individuals responsible for writing and/or maintaining the code; (v) the number of developers who have changed or modified a piece of code; and/or (vi) testing procedures that have been performed on the code (whether original source code or compiled object code). A defect is "opened" when a development team assesses a reported problem on a software application. If the problem is valid, and there is no work-around solution, or if the problem is serious enough to disrupt operations, a defect is opened to develop a fix, test the fix, and provide the fix to a customer.

In step 204, CSI analyzer 112 measures the risk-relevant historical data for each CSI component. The risk-relevant historical data is data associated with source code 118 from repository 116 or other computing devices (not shown) in data processing environment 100. Examples of risk-relevant historical data are modified files, changesets, executed tests (i.e., both automated and manually). A modified file is any file where the data content or metadata has changed from a previous version, to a changed or updated version. Metadata is data that describes other data. Generally, there are two metadata types, structural metadata and descriptive metadata. Structural metadata is data about the containers of data (e.g., how compound objects are put together). Descriptive metadata uses individual instances of application data or the data content (e.g., describes a resource for discovery and identification. In revision control, a changeset is a set of changes that are grouped for a particular reason (e.g. the list of differences between two successive versions of data), in the repository. The executed tests include both manual and automated tests that verify the functionality of source code 118 and/or the performance of source code 118.

CSI analyzer 112 classifies the measured risk-relevant data, also referred to as features, into risk-increasing data and risk-decreasing data as depicted in step 206. Features are the data associated with the CSI that are collected from repository 116 and or other computing devices of data processing environment 100 for a specified time range. In other example embodiments, the features may be collected from more than one computing device in data processing environment 100. For every execution of CSI analyzer 112, a time range is set for collecting data (based, for example, on the number of defects from a previous iteration). Increasing the time range and the number of collected features results in a more precise risk prediction by CSI analyzer 112 for each of the components. The time range may be a configurable attribute of CSI analyzer. In other example embodiments, the time range and number of collected features may be configured by one or more users on one or more computing devices in data processing environment 100. In another example embodiment, the number of collected features may be a dynamic process that tracks the number of releases for each of the components and re-measures and reclassifies data when a change or fix is made in any of the releases.

FIG. 3A is a table depicting erroneous software component data for various features of software components, in an embodiment in accordance with the present invention. As depicted in FIG. 3A, examples of features that potentially have an increasing risk include: the number of defects reported by customers in previous releases that also exist in the current release, the number of changesets in a specific time range, the number of changeset owners (i.e., developers) for changesets in a specific time range, the number of modified files in a component in a specific time range, and the number of violations or warnings (e.g., LOW, MEDIUM, HIGH) in a static code analysis for the last build in a particular CSI. MEDIUM and HIGH warnings for the static code analysis have higher weights. Violations or warnings refer to programming mistakes or possible programming mistakes found in the static code analysis. In an example embodiment, the violations or warnings are weighted with "1" corresponding to LOW, "2" corresponding to MEDIUM, and "3" corresponding to HIGH. The number of violations in a particular CSI is calculated as a sum of the violations using the following formula:

$$(\Sigma lv)+(2*\Sigma mv)+(3*\Sigma hv)$$

where lv indicates the LOW violations, mv indicates the MEDIUM violations, and hv indicates the HIGH violations.

Examples of features that potentially have a decreasing risk include: the number of defects created in a specific time range that include a severity, the number of all test cases covering a specific CSI, the hot factor, and the number of manual tests executed in the component or feature. The hot factor is the percentage value of the results from the automated tests per CSI for the last build. The hot factor may be calculated using the following formula:

$$hf = \frac{(ap*tp)*(srt*srp)}{2}$$

where hf indicates the calculated hot factor, ap indicates the attempted points of all the tests, tp indicates the total points of all the tests, srt indicates the success rate of all the tests, and srp indicates the success rate points of all the tests. Another feature that potentially has a decreasing risk severity is the classification of a software defect (i.e., bug) that indicates the degree of negative impact on the quality of the software.

In step 208, CSI analyzer 112 normalizes the measured risk-relevant data using a standard score. In statistics, a standard score is a signed number of standard deviations an observation or data set is above the mean. A positive standard score indicates a data set above the mean, while a negative standard score indicates a data set below the mean. A standard score can be obtained by subtracting the population mean from an individual raw score and then dividing the difference by the population standard deviation. In the example embodiment, the risk-relevant data is normalized using the following formula:

$$z = \frac{x-\mu}{\sigma}$$

where z indicates the normalized risk-relevant data, x indicates the raw score, μ indicates the mean of the population, and σ indicates the deviation of the population. In statistics and data analysis, a raw score, represented by the Greek letter μ, is an original data set that has not been transformed (e.g., the risk-relevant data seen in FIG. 3A). In statistics, a population is a complete set of items that share at least one property in common that is the subject of a statistical analysis (e.g., all the CSIs with one or more changeset owners). In statistics, a deviation (i.e., represented by the Greek letter sigma, σ), is a measure that is used to quantify the amount of variation of a set of data values. A deviation close to zero indicates that the data points tend to be very close to the mean, also referred to as the expected value, of the set, while a high deviation indicates that the data points are spread out over a wider range of values. In many embodiments, normalizing the risk-relevant data is crucial to the failure risk formula, described in step 210, because normalizing the risk-relevant data makes the failure risk formula self-regulating. Stated another way, normalizing the risk-relevant data means that a critical low value of some attribute, that should decrease the risk, will increase the risk and vice versa.

FIG. 3B is a table depicting normalized erroneous software component data for the various features of software components, in an embodiment in accordance with the present invention. As seen in FIG. 3B, normalization of the risk-relevant data results in the risk-relevant data have relatively low positive and negative values. Features with relatively low values prior to normalization, will have a negative value after normalization. In other example embodiments, the risk-relevant data may be normalized using any formula and/or computational processes known in the art.

CSI analyzer 112 calculates a failure risk value for each component as being a weighted sum of normalized values of the risk-increasing data, subtracting a weighted sum of normalized values of the risk-decreasing data as depicted in step 210. In the example embodiment and as depicted in FIG. 3B, the weights are positive in value for risk-increasing data or features, and are negative in value for risk-decreasing data or features. The weights are set experimentally through an iterative process where different values are used and tested. The risk value for each component is calculated using the following formula:

$$r = (w1*na) + (w2*co) + (w3*nc) + (w4*nf) + (w5*nd) + (w6*sa) + (w7*hf) + (w8*mt) + (w9*at)$$

where r indicates the failure risk value for each component, w1 indicates the weight value for each authorized program analysis report (APAR, also sometimes referred to as a analysis report), na indicates the number of APARs for the component, w2 indicates the weight value for the number of changeset owners for the given component, co indicates the number of changeset owners for the given component, w3 indicates the weight value for the number of changesets for the component, nc indicates the number of changesets for the component, w4 indicates the weight value for the number of changed or modified files, of indicates the number of affected files as a result of the modified files, w5 indicates the weight value for the number of defects for the component, nd indicates the number of defects, w6 indicates the weight value for the static code analysis for the current version of source code 118, sa indicates the static code analysis of the current version of source code 118, w7 indicates the weight of the hot factor for the given component, hf indicates the hot factor for the given component, w8 indicates the weight for the manual test cases, mt indicates the number of manual test cases for the component, w9 indicates the weight value for the automated test cases, and at indicates the number of automated test cases for the component. An APAR is a term used for a description of a problem with a program (i.e., software application code), that is formerly tracked until a solution is provided. An APAR is created after a user discovers a problem that is determined to be due to a bug in the code. The APAR is given a unique number for tracking and a target date for solution.

In step 212, CSI analyzer 112 orders the CSI components, also referred to as components, in dependence on the components' associated failure risk values. CSI analyzer 112 arranges the CSI components based on the computed risk values as depicted in FIG. 3C. FIG. 3C is a table depicting ordered software components in dependence of computed associated failure risk values, in an embodiment in accordance with the present invention. As illustrated in FIG. 3C, CSI-7 was found to have the lowest computed failure risk value and CSI-2 had the highest failure risk value. A contributing factor in the final failure risk value of CSI-2 can be seen in FIG. 3A in the number of affected files metric. The number of files affected by the changeset was 22 files for CSI-2 and resulted in the largest impact to the component, thus having the highest risk value. Using the output of FIG. 3C, a test team can focus, or place a higher priority, on testing CSI-2.

CSI analyzer 112 performs a software failure test prioritizing the components with the higher risk value as depicted in step 214. CSI analyzer 112 performs a set of automated tests on the CSI components with the highest risk values to verify code functionality and ensure the highest software quality set by industry standards and the software development team. In other example embodiments, the implemented algorithm executed by CSI analyzer 112 may return a map of the high risk areas in the product that will focus the attention of a test team in the next iteration of test planning.

CSI analyzer 112 collects and classifies the risk-relevant historical data into risk-increasing and risk-decreasing data sets as described in FIG. 2 and depicted in FIG. 3A. The features, also referred to as metrics, are collected for a defined time range, such as the risk-relevant historical data from two previous releases to the current release in development. The data collected by CSI analyzer 112 includes the number of APARs, the number of changeset owners, the number of changesets in the current code, the number of affected files by the changeset, the number of defects in the component, the static code analysis of the current version of source code, the hot factor for the component, the number of automated tests executed on the component, and the number of manual tests executed on the component as depicted for CSI-1 through CSI-7.

In certain embodiments, CSI analyzer 112 classifies the risk-relevant data into risk-increasing and risk-decreasing values based on a comparison of the particular risk-relevant data with other risk-relevant data from other components. For example, in an embodiment, if the value of attribute "X" is "1" for a particular component, but the value of the same attribute is above "1000" for every other component, attribute "X" may be classified as risk-increasing data for the particular component. In this case, the attribute value of "1" indicates an increased risk because it "stands out" (i.e., differs) so greatly from the rest of the values of the same attribute. Some examples of attributes that may be classified in this way include, but are not limited to: the number of changesets for a particular component, the number of changeset owners for a particular component, and/or the number of APARs for a particular component, the number of files affected by the changesets, and a static code analysis for the particular component.

CSI analyzer 112 normalizes the risk-relevant data and calculates a failure risk value for each component as being a weighted sum of normalized values of the risk-increasing data, subtracting a weighted sum of normalized values of the risk-decreasing data as described in step 208 of FIG. 2 and depicted in FIG. 3B. Weight values for each metric are included in FIG. 3B, and are positive in value for risk-increasing data or features, and are negative in value for risk-decreasing data or features. The weights are set experimentally through an iterative process where different values are used and tested. In FIG. 3B, the weights are positive in value for risk-increasing data and negative in value for risk-decreasing data. For example, the number of defects metric has a negative weight value (e.g., "−1" for the number of defect metric), if a defect was opened. The negative weight value indicates test effort put forth and met with successful results in that particular CSI. The negative weight value in turn decreases the risk for the CSI or feature (e.g., the value of "−0.82" for the number of defects for CSI-7). In general, any defined range of weight values for risk-increasing and risk-decreasing data may be used in determining the risk for a given CSI or component. The calculated failure risk values are also included in FIGS. 3B and 3C as positive in value for risk-increasing components, and as negative in value for risk-decreasing components. FIGS. 3B and 3C also include the rescaled failure risk values. The rescaled failure risk value, also referred to as min-max normalization, is calculated using the following formula:

$$rr = \left(\frac{x - \min}{\max - \min}\right) * 100$$

where rr indicates the rescaled failure risk value, x indicates the failure risk value, min indicates the minimum value from the failure risk set, and max indicates the maximum value from the failure risk set. Using the rescaled failure risk formula and the calculated failure risk values in FIG. 3B, the rescaled failure risk value for CSI-6 is found to be 14.80. The rescaled failure risk value of CSI-6 is relatively low when compared to the rescaled failure risk value of CSI-2, indicating the need for a higher focus from the test team or a higher priority for CSI analyzer 112 to run automated tests against the component.

CSI analyzer 112 arranges the CSI according to the calculated failure risk values as depicted in FIG. 3C. As illustrated in FIG. 3C, CSI-7 was found to have the lowest computed failure risk value and CSI-2 had the highest failure risk value. A contributing factor in the final failure risk value of CSI-7 can be seen in FIG. 3A and the number of automated tests metric. In this example embodiment, the number of automated tests was 22 files for CSI-2. This resulted in the lowest impact and a favorable hot factor for the component thus having the lowest risk value. As illustrated in FIG. 3C and described previously, CSI-2 was found to have the highest failure risk value resulting in the largest impact to the component thus having the highest risk value. Using the output of FIG. 3C, the test team can focus, or place a lower priority, on testing CSI-7 while focusing more effort on CSI-2.

Figure 4:
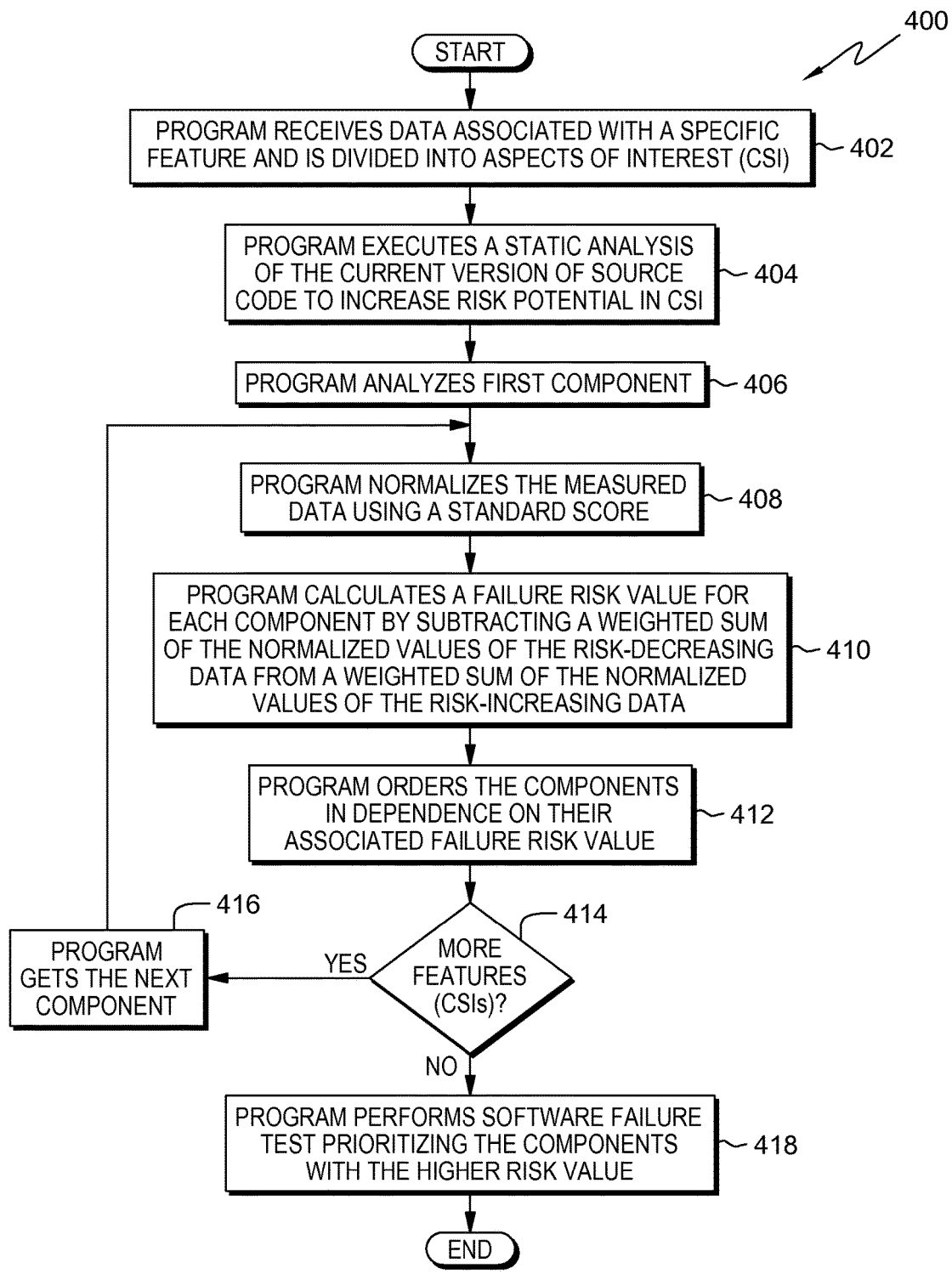
FIG. 4 illustrates operational steps of a CSI analyzer performing erroneous software component detection and prediction on a software repository within the data processing environment of FIG. 1, in an embodiment in accordance with the present invention.

FIG. 4, generally designated 400, illustrates operational steps of a CSI analyzer 112, a program for performing erroneous software component detection and prediction on source code repository 116 within the data processing environment of FIG. 1, in an embodiment in accordance with the present invention. In the example embodiment, CSI analyzer 112 receives data associated with a specific features associated with source code 118 stored in repository 116 and divides or subdivides the software into aspects of interest (i.e., CSI), as depicted in step 402. In other example embodiments, the aspects of interest or CSIs may be received with the data associated with the specific features of source code 118.

In step 404, CSI analyzer 112 begins a static code analysis of the current version of source code 118 in repository 116 using static code analyzer 110 on computer 102 to increase the risk potential in the CSIs. Performing a static code analysis of the current version of source code 118 allows CSI analyzer 112 to obtain the delta from a specific period of time. In an example, a static code analysis is performed on a fix pack release with a three month long development cycle, where the fix pack release includes a cumulative collection of code fixes that have been made since the last release of the software program. First, CSI analyzer 112 determines a static code analysis result or delta relating to the beginning of the fix pack development cycle and the current build. The final delta covers the full fix pack timeframe of three months (e.g., the snapshot from the first day vs. the last build). In other example embodiments, static code analyzer 110 may be included in repository 116 and performs interim static analysis on source code 118 based on defined build schedules and checkpoints.

CSI analyzer 112 then begins to analyze the first component of the one or more components of source code 118, as depicted in step 406 (where the analysis includes the operations performed by steps 408, 410, and 412, discussed below). In other example embodiments, CSI analyzer 112 may perform the required calculations simultaneously by spawning or creating separate threads to normalize the measured risk-relevant data and generate a calculated risk failure value for the other components of source code 118. A thread of execution is a (typically small) sequence of programmed instructions that can be managed independently by a scheduler, which is typically a part of the operating system.

In step 408, CSI analyzer 112 normalizes the measured risk-relevant data using a standard score. In many embodiments, normalizing the risk-relevant data can be an important part in the failure risk formula (see, for example, FIG. 2). Normalizing the risk-relevant data allows the failure risk formula to be self-regulating. Stated another way, when a risk-relevant data value is critically low, it can greatly decrease the calculated failure risk value. However after normalizing the critical low value of the risk-relevant data, the normalized value will increase the calculated failure risk value, rather than decrease it. The same applies when a risk-relevant data values is critically high. Generally speaking, normalizing the risk-relevant data ensures all data used for the failure risk value is on the same scale. As illustrated in FIG. 3B, the normalization of the risk-relevant data results in the risk-relevant data to have relatively low positive and negative values. Features with relatively low values will have a negative value after normalization. In other example embodiments, the normalization of the risk-relevant data may be performed by another computing device in data processing environment 100.

CSI analyzer 112 then calculates the failure risk value for the component as being a weighted sum of normalized values of the risk-increasing data, subtracting a weighted sum of normalized values of the risk-decreasing data as described in FIG. 2 and depicted in step 410. For the example embodiment, and as described in FIG. 2 and depicted in FIG. 3B, the values in FIG. 3B that are positive or greater than 0 indicate increasing risk, whereas numbers that are negative or less than zero indicate decreasing risk. In other example embodiments, the weights may be defined manually by an administrator or a tester wanting a specific weight to be used in the risk analysis. In another example embodiment, the weights may be determined programmatically by CSI analyzer 112 based on a desired range an administrator or tester may want for the failure risk values.

In step 412, CSI analyzer 112 groups or orders the components according to the calculated failure risk values. CSI analyzer 112 arranges the CSI components based on the computed risk values computed in FIG. 2 and depicted in FIG. 3C (e.g., arranged in priority order highest to lowest risk). In other example embodiments, the calculated failure risk values may be organized in any ascending or descending order based on user preferences configured on CSI analyzer 112 or computer 102.

In decision step 414, CSI analyzer 112 determines whether additional components need to be analyzed for the set of CSIs. If CSI analyzer 112 determines additional components need to be analyzed for the set of CSIs ("Yes" branch, decision 414), then CSI analyzer 112 gets the next component to analyze as depicted in step 416. If CSI analyzer 112 determines no additional components need to be analyzed ("No" branch, decision 414), then CSI analyzer 112 may perform a software failure test on the analyzed components, prioritizing the components with the higher failure risk values first. In other example embodiments, CSI analyzer 112 may, in addition to performing the automated tests, notify or send out alerts for components with abnormally high failure risk values. The notifications may be an email and/or a mobile text and/or an automated phone call.

Figure 5:
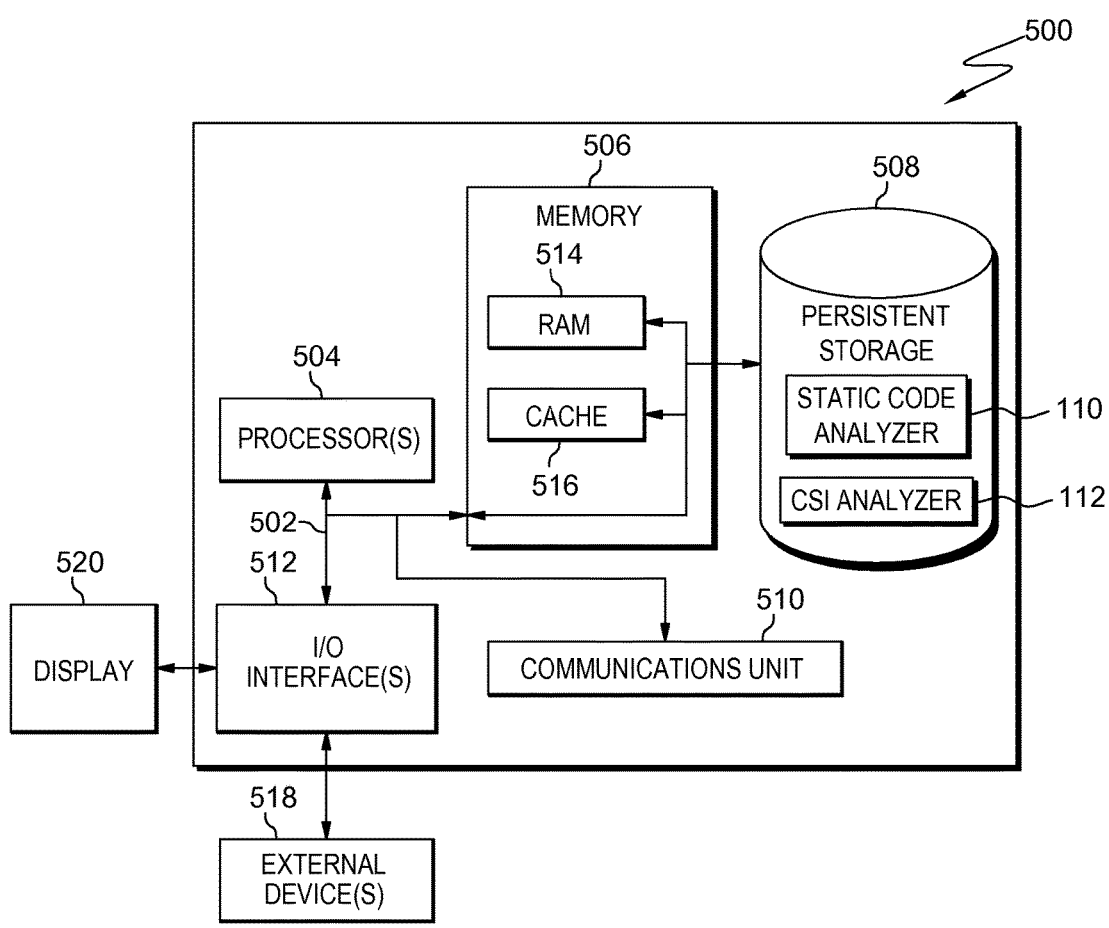
FIG. 5 depicts a block diagram of components of the computer executing the erroneous software component detection and prediction, in an embodiment in accordance with the present invention.

FIG. 5 depicts a block diagram, generally designated 500, of components of the computer executing the erroneous software component detection and prediction, in an embodiment in accordance with the present invention. It should be appreciated that FIG. 5 provides only an illustration of one implementation and does not imply any limitations with regard to the environments in which different embodiments may be implemented. Many modifications to the depicted environment may be made.

Computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Static code analyzer 110 and CSI analyzer 112 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 114 and repository 116. In these examples, communications unit 510 includes one or more network interface cards. Communications unit 510 may provide communications through the use of either or both physical and wireless communications links. Static code analyzer 110 and CSI analyzer 112 may be downloaded to persistent storage 508 through communications unit 510.

I/O interface(s) 512 allows for input and output of data with other devices that may be connected to computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., static code analyzer 110 and CSI analyzer 112, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for performing software error detection and prediction, the method comprising:

identifying, by one or more processors, a plurality of software components of a software product, in a development cycle, in a source code repository;

for each software component of the plurality of software components:

measuring, by one or more processors, risk-relevant historical data pertaining to the respective software component, wherein the risk-relevant historical data includes one or more changesets relating to the respective software component that identify: (i) a number of developers who have changed or modified a piece of code, and (ii) a number of owners for the respective changeset, classifying, by one or more processors, the risk-relevant historical data into at least a set of risk-increasing data and a set of risk-deceasing data, wherein when the number of owners of a respective changeset relating to the respective software component differs substantially from numbers of owners for changesets relating to other software components of the plurality of software components, the number of owners of the respective changeset relating to the respective software component is classified as risk-increasing data, normalizing, by one or more processors, values for the set of risk-increasing data and the set of risk-decreasing data, and calculating, by one or more processors, a failure risk value for the respective software component by subtracting a weighted sum of the normalized values for the risk-decreasing data from a weighted sum of the normalized values for the risk-increasing data;

compiling, by one or more processors, a source code build of the software product in the source code repository, wherein the source code build includes the identified plurality of software components; and performing, by one or more processors, a software failure test on the compiled source code build of plurality of software components in the software product, wherein components with higher computed failure risk values are prioritized over components with lower computed failure risk values; and upon compiling the source code build of the software product in the source code repository, executing, by one or more processors, a static code analysis of the software product in the source code repository, wherein the static code analysis of the software product includes determining if one or more memory leaks are present in the identified plurality of software components that are determined to have higher computed failure risk values.

2. The method of claim 1, further comprising:
ordering, by one or more processors, the software components of the plurality of software components based, at least in part, on their associated failure risk values, wherein the associated failure risk values for the plurality of software components are organized from highest to lowest; and returning, by one or more processors, a map of the plurality of software components in the software product that identifies one or more high risk software components based on the calculated failure risk values.

3. The method of claim 1, wherein the risk-relevant historical data includes the following:
one or more analysis reports relating to a previous version of the respective software component;
one or more owners of one or more changesets relating to the respective software component;
a static code analysis of a current version of source code for the respective software component, wherein the static code analysis of the current version of source code is based on defined build schedules and checkpoints;
one or more programming errors for the respective software component; and
one or more hot factors for the respective software component, wherein a hot factor is a percentage value resulting from automated tests for the respective software component for a previous build.

4. The method of claim 1, wherein normalizing the values for the set of risk-increasing data and the set of risk-decreasing data comprises:
calculating the mean of the values for the respective set of risk-increasing data or risk-decreasing data;
calculating the standard deviation of the values for the respective set of risk-increasing data or risk-decreasing data; and
for each value in each respective set of risk-increasing data or risk-decreasing data, subtracting the respective mean from the respective value and dividing the difference by the respective standard deviation.

5. The method of claim 1, wherein measuring the risk-relevant historical data comprises:
collecting the risk-relevant historical data for a determined time range, wherein the determined time range includes a plurality of risk-relevant historical data from one or more previous versions of the software components.

6. The method of claim 1, wherein the normalized values for risk-increasing data are positive and the normalized values for risk-decreasing data are negative.

7. A computer program product for performing software error detection and prediction, the computer program product comprising:
one or more computer readable storage media and program instructions stored on the one or more computer readable storage media, the stored program instructions comprising:
program instructions to identify a plurality of software components of a software product, in a development cycle, in a source code repository;
program instructions to, for each software component of the plurality of software components:
measure risk-relevant historical data pertaining to the respective software component, wherein the risk-relevant historical data includes one or more changesets relating to the respective software component that identify: (i) a number of developers who have changed or modified a piece of code, and (ii) a number of owners for the respective changeset,
classify the risk-relevant historical data into at least a set of risk-increasing data and a set of risk-deceasing data, wherein when the number of owners of a respective changeset relating to the respective software component differs substantially from numbers of owners for changesets relating to other software components of the plurality of software components, the number of owners of the respective changeset relating to the respective software component is classified as risk-increasing data,
normalize values for the set of risk-increasing data and the set of risk-decreasing data, and
calculate a failure risk value for the respective software component by subtracting a weighted sum of the normalized values for the risk-decreasing data from a weighted sum of the normalized values for the risk-increasing data;
program instructions to compile a source code build of the software product in the source code repository, wherein the source code build includes the identified plurality of software components; and
program instructions to perform a software failure test on the compiled source code build of plurality of software components in the software product, wherein components with higher computed failure risk values are prioritized over components with lower computed failure risk values; and
program instructions to, upon compiling the source code build of the software product in the source code repository, execute a static code analysis of the software product in the source code repository, wherein the static code analysis of the software product includes determining if one or more memory leaks are present in the identified plurality of software components that are determined to have higher computed failure risk values.

8. The computer program product of claim 7, wherein the stored program instructions further comprise:
program instructions to order the software components of the plurality of software components based, at least in part, on their associated failure risk values, wherein the associated failure risk values for the plurality of software components are organized from highest to lowest; and
program instructions to return a map of the plurality of software components in the software product that identifies one or more high risk software components based on the calculated failure risk values.

9. The computer program product of claim 7, wherein the risk-relevant historical data includes the following:
one or more analysis reports relating to a previous version of the respective software component;
one or more owners of one or more changesets relating to the respective software component;
a static code analysis of a current version of source code for the respective software component, wherein the static code analysis of the current version of source code is based on defined build schedules and checkpoints;
one or more programming errors for the respective software component; and
one or more hot factors for the respective software component, wherein a hot factor is a percentage value resulting from automated tests for the respective software component for a previous build.

10. The computer program product of claim 7, wherein the program instructions to normalize the values for the set of risk-increasing data and the set of risk-decreasing data comprise:
program instructions to calculate the mean of the values for the respective set of risk-increasing data or risk-decreasing data;
program instructions to calculate the standard deviation of the values for the respective set of risk-increasing data or risk-decreasing data; and
program instructions to, for each value in each respective set of risk-increasing data or risk-decreasing data, subtract the respective mean from the respective value and dividing the difference by the respective standard deviation.

11. The computer program product of claim 7, wherein the program instructions to measure the risk-relevant historical data comprises:
program instructions to collect the risk-relevant historical data for a determined time range, wherein the determined time range includes a plurality of risk-relevant historical data from one or more previous versions of the software components.

12. The computer program product of claim 7, wherein the normalized values for risk-increasing data are positive and the normalized values for risk-decreasing data are negative.

13. A computer system for performing software error detection and prediction, the computer system comprising:
one or more computer processors;
one or more computer readable storage media;
program instructions stored on the computer readable storage media for execution by at least one of the one or more processors, the stored program instructions comprising:
program instructions to identify a plurality of software components of a software product, in a development cycle, in a source code repository;
program instructions to, for each software component of the plurality of software components:
measure risk-relevant historical data pertaining to the respective software component, wherein the risk-relevant historical data includes one or more changesets relating to the respective software component that identify: (i) a number of developers who have changed or modified a piece of code, and (ii) a number of owners for the respective changeset,
classify the risk-relevant historical data into at least a set of risk-increasing data and a set of risk-deceasing data, wherein when the number of owners of a respective changeset relating to the respective software component differs substantially from numbers of owners for changesets relating to other software components of the plurality of software components, the number of owners of the respective changeset relating to the respective software component is classified as risk-increasing data,
normalize values for the set of risk-increasing data and the set of risk-decreasing data, wherein the normalized values for risk-increasing data are positive and the normalized values for risk-decreasing data are negative, and
calculate a failure risk value for the respective software component by subtracting a weighted sum of the normalized values for the risk-decreasing data from a weighted sum of the normalized values for the risk-increasing data;
program instructions to compile a source code build of the software product in the source code repository, wherein the source code build includes the identified plurality of software components; and
program instructions to perform a software failure test on the compiled source code build of plurality of software components in the software product, wherein components with higher computed failure risk values are prioritized over components with lower computed failure risk values; and
program instructions to, upon compiling the source code build of the software product in the source code repository, execute a static code analysis of the software product in the source code repository, wherein the static code analysis of the software product includes determining if one or more memory leaks are present in the identified plurality of software components that are determined to have higher computed failure risk values.

14. The computer system of claim 13, wherein the stored program instructions further comprise:
program instructions to order the software components of the plurality of software components based, at least in part, on their associated failure risk values, wherein the associated failure risk values for the plurality of software components are organized from highest to lowest; and
program instructions to return a map of the plurality of software components in the software product that identifies one or more high risk software components based on the calculated failure risk values.

15. The computer system of claim 13, wherein the risk-relevant historical data includes the following:
one or more analysis reports relating to a previous version of the respective software component;
one or more owners of one or more changesets relating to the respective software component;
a static code analysis of a current version of source code for the respective software component, wherein the static code analysis of the current version of source code is based on defined build schedules and checkpoints;
one or more programming errors for the respective software component; and
one or more hot factors for the respective software component, wherein a hot factor is a percentage value resulting from automated tests for the respective software component for a previous build.

16. The computer system of claim 13, wherein the program instructions to normalize the values for the set of risk-increasing data and the set of risk-decreasing data comprise:
- program instructions to calculate the mean of the values for the respective set of risk-increasing data or risk-decreasing data;
- program instructions to calculate the standard deviation of the values for the respective set of risk-increasing data or risk-decreasing data; and
- program instructions to, for each value in each respective set of risk-increasing data or risk-decreasing data, subtract the respective mean from the respective value and dividing the difference by the respective standard deviation.

17. The computer system of claim 13, wherein the program instructions to measure the risk-relevant historical data comprise:
- program instructions to collect the risk-relevant historical data for a determined time range, wherein the determined time range includes a plurality of risk-relevant historical data from one or more previous versions of the software components.

\* \* \* \* \*